United States Patent Office 2,780,584
Patented Feb. 5, 1957

2,780,584

HYDROFORMING OF A NAPHTHA WITH A NICKEL OXIDES-ON-ALUMINA CATALYST CONTAINING SMALL AMOUNTS OF SULPHUR

Thomas F. Doumani, Los Angeles, Calif., assignor to Union Oil Company of California, Los Angeles, Calif., a corporation of California No Drawing. Application November 20, 1951,
Serial No. 257,415

8 Claims. (Cl. 196—50)

This invention relates generally to new catalysts and catalytic processes for the conversion of hydrocarbons and hydrocarbon mixtures. More particularly, the invention relates to new and improved methods for the treatment of carrier-supported metal hydrogenation catalysts to render them more selective in their activity. It is concerned especially with the preparation of alumina catalysts impregnated with transitional group metals, particularly those of groups VIII and VI-B, wherein the metal on the carrier is partially sulfided under controlled conditions to yield a catalyst particularly useful in the reforming of hydrocarbons and hydrocarbon mixtures in the presence of hydrogen. The invention includes also the hydrocarbon conversion processes employing these catalysts.

A catalyst suitable for reforming of hydrocarbon stocks at high temperatures should exhibit a minimum tendency for destructive hydrogenation resulting in the scission of carbon-carbon bonds, while at the same time exhibiting pronounced activity favoring the reformation of hydrocarbon molecules to other molecules containing substantially the same number of carbon atoms per molecule. The latter reactions are characterized by hydrogenation, dehydrogenation, isomerization, desulfurization, denitrogenation, and the like.

Nickel catalysts have been employed in the prior art for the hydrogenation and dehydrogenation of various organic substances such as hydrocarbons. Generally, such catalysts have been of little practical value in the reforming of hydrocarbon stocks owing to their pronounced tendency to cause scission of carbon-carbon bonds, accompanied by coke deposition and consequent rapid fouling of the catalysts. The nickel sulfide catalysts and other metal sulfide catalysts, as prepared by prior art methods, generally exhibit low activities for the desired reforming reactions.

The present invention is based upon the discovery that by impregnating alumina carriers with nickel salts, for example, and calcining the impregnated catalysts in such manner as to yield metallic nickel or nickel oxide, and thereafter sulfiding the composite catalyst at relatively low temperatures, and preferably reducing the sulfided catalyst with hydrogen, all in such manner as to provide a desired ratio between sulfide and nickel, a catalyst is obtained which shows excellent activity for hydroforming, i. e., reforming in the presence of hydrogen, while at the same time causing only minor amounts of cracking and destructive hydrogenation of the feed stocks to produce low boiling hydrocarbons and hydrocarbon gases. The catalysts prepared in this specific manner appear to inhibit the hydrocracking reactions while not impairing the reforming properties of the nickel component. Such catalysts give high liquid recoveries, increased yields of hydrogen, and relatively decreased yields of methane and other lighter hydrocarbons resulting from hydrocracking of the feed stock. The activity of the selectively sulfided nickel-alumina catalyst can be further increased by impregnating inorganic halogen-containing acids on the carrier, or on the impregnated catalyst prior to sulfiding.

It is an object of this invention to provide catalysts for reforming which produce little or no splitting of the feed stock molecules.

It is another object of this invention to provide a nickel catalyst for use in hydrocarbon conversion reactions which gives high yields of hydrogen and produces small coke laydown on the catalyst.

It is another object of this invention to provide a process for the catalytic upgrading of gasoline with selectively inhibited metal catalysts selected from the transitional elements of groups VIII and VI-B of the periodic table.

It is another object of this invention to promote such selectively inhibited catalysts with inorganic halogen-containing acids.

Other objects and advantages of this invention will become apparent to those skilled in the art as the description thereof proceeds.

Briefly, this invention, in a preferred form, relates to the preparation and use of certain alumina-supported sulfidable metal hydrogenation catalysts which have been partially sulfided at low temperatures, and either simultaneously or subsequently reduced with hydrogen in order to provide a final mole-ratio of metal hydrogenation catalyst to sulfide of preferably greater than about 5.0. Alternatively, by sulfiding under carefully controlled conditions of temperature and $H_2S$ pressure, the hydrogenation step may be omitted. The invention also includes the use of such catalysts in the catalytic reforming of hydrocarbons, either with or without added hydrogen.

The preferred carriers which havce been found suitable for distending the nickel component, or other active metal or metal oxide may comprise alumina and other carriers containing a major proportion of alumina. The carrier usually contains at least about 80% by weight of alumina. Such carriers, in addition to the alumina, may contain minor proportions, such as between about 0.5% and 20% by weight of other oxides such as silica, titania, ferric oxide, stannic oxide, magnesia, magnesium hydroxide, thoria, zirconia, and the like. The preferred carrier is activated gel-type alumina. Gel-type aluminas are generally characterized by their high surface areas. Gel aluminas usually have surface areas over 100 sq. meters/grams when measured by gas adsorption. Alumina gels containing between about 1% and 15% and preferably between about 3% and 8% of coprecipitated silica are especially suitable carriers. The presence of the small amount of silica in the alumina appears to stabilize the resulting catalyst and prolongs the catalyst life, as described in U. S. Patent 2,437,532.

Other carriers may be employed, such for example as activated silica gels, montmorillonite clay, or any porous inert material. However, the alumina carriers described above are particularly suitable for reforming.

In the preferred method for the preparation of the catalyst, an impregnation step is employed wherein the dried carrier is immersed in an aqueous solution containing a soluble nickel salt or other soluble active metal salt, and the impregnated carrier is thereafter separated from the solution, dried and calcined to reduce the impregnated metal salt to an oxide or the free metal.

In one modification of the invention, hydrofluoric acid and/or hydrochloric acid may be impregnated onto the carrier, either simultaneously, or before, or after impregnation with the metal salt.

Prior to the impregnation steps, the carrier is normally shaped into the physical form desired for the catalyst. For this purpose the dried carrier is usually ground, mixed with a lubricant, such as graphite and/or hydrogenated vegetable oil, and pilled. In the activation of the carrier by heating, the lubricant is removed by combustion. Alternatively, the carrier may be used in granular form, or it may be ground into powder, made into a paste and extruded. Where the catalyst is to be employed in a fluidized process, such as in fluidized desulfurization, denitrogenation, and the like, the carrier is formed into a finely divided state, as in micro-bead form, or it is ground into a fine state and is thereafter impregnated. In the case of fluidized processes, the carrier can be impregnated in larger form, e. g., granules, pills, etc., and thereafter ground to the desired powder size for the processing.

In the preparation of the carrier for impregnation with metal salt and/or the inorganic halogen-containing acid, the heating or activation step to render it sufficiently adsorbent may be effected by heating from two to six hours at 750° F. to 1625° F., for example. The carrier is cooled and is thereafter immersed in the metal salt impregnation solution. Where multiple impregnations are employed, such as where nickel and another metal, or nickel and an inorganic halogen acid are separately impregnated, the carrier is normally reactivated by heating to at least about 300° F. and preferably to above about 500° F. between impregnations.

The metal salt impregnation solution is preferably an aqueous solution of a nickel salt such as the nitrate. The concentration of the nickel in the solution will depend upon the particular carrier being employed and upon the desired concentration of nickel or other metal in the finished catalyst. In using nickel, I prefer to provide about 0.4% to 50% of nickel in the final catalyst. For this purpose, the impregnation solution may contain between about 2 and 120 grams of nickel nitrate for 100 ml. of solution. The higher concentrations of active metal on the final catalyst, for example, above about 30%, are usually, though not necessarily, obtained by multiple impregnation, or preferably by coprecipitation.

In the impregnation of the carrier with a nickel salt, the activated carrier is immersed in the impregnation solution for a short time, such as between about 2 minutes and 60 minutes, for example. A more uniform penetration of the impregnation solution is obtained with longer impregnation periods.

After immersion in the impregnation solution, a part of the impregnation solution is adsorbed by the carrier and the excess solution is thereafter removed. The impregnated carrier, after draining and drying in a low temperature oven, such as at 180° F. to 230° F., for example, is finally activated by heating to a temperature of 600° F. to 1000° F. for two to six hours. The final activation may be carried out by bringing the dried impregnated carrier to the required reaction temperature.

Although the impregnation method described hereinbefore is the preferred method for adding the metal hydrogenation catalyst to the carrier, other methods may be employed such as coprecipitation and copilling. Thus, a hydrous alumina gel may be mixed with an aqueous solution of nickel nitrate, for example, and the mixture dried at 200° F. to 300° F., for example, to obtain the intermediate catalyst composite.

It is usually essential to the process that the impregnated catalyst should be anhydrous prior to the sulfiding treatment, or other selective inhibiting treatment. The presence of water in the catalyst will cause the active metal or metals to be rapidly and completely sulfided, and such sulfide may not be removed readily by hydrogenation to give the desired spatial distribution and ratio of sulfur to metal. In the sulfiding procedure employed herein, certain critical conditions must be observed in order to produce catalysts having the desired degree and type of activity. At a minimum, it appears that two essential requirements must be observed, namely that (1) the sulfiding must take place at low temperatures, for example, from below room temperature to about 650° F., and (2) the quantity of sulfur added must be either controlled or reduced with hydrogen until the molar ratio of active metal to sulfur is substantially greater than stoichiometric, and preferably 5 or greater.

In the preferred procedure for sulfiding, the impregnated and calcined catalyst is treated at from room temperature or below to about 650° F., and at pressures ranging from atmospheric or below to a non-critical upper limit with hydrogen sulfide until the desired amount of sulfur is absorbed. In the preferred anhydrous state, and at the preferred temperatures, an equilibrium will usually be reached short of a complete sulfiding of the sulfidable metal or metals.

Various sulfiding agents may be employed to sulfide the catalyst. The preferred agent is hydrogen sulfide, but other sulfiding material such as a mixture of sulfur dioxide and hydrogen, carbon disulfide, or a mixture of hydrogen sulfide with inert gases such as carbon dioxide or nitrogen may be employed. Any material may be used which yields hydrogen sulfire under the reaction conditions and does not give a substantial amount of coke. A mixture of hydrogen sulfide and hydrogen may also be employed and in this case the ratio of hydrogen to hydrogen sulfide may be so adjusted, along with the process variables, as to obtain an equilibrium between the sulfiding and desulfiding reactions. In this manner it is possible to obtain a catalyst sulfided to the desired degree without resorting to a subsequent hydrogenation step for desulfiding.

After the catalyst has been sulfided as outlined above, it is then preferably desulfided with hydrogen at temperatures preferably somewhat higher than the sulfiding temperatures, for example, from about 650° F. to 900° F. or higher, and at pressures ranging from atmospheric to a non-critical upper limit above 1000 pounds per square inch. The time required for desulfiding with hydrogen varies in proportion to the extent of initial sulfiding, and the severity of the reaction conditions, as will be understood by those skilled in the art.

The finished catalyst should contain a mole-ratio of total effective metal to sulfur of greater than the normal stoichiometric ratios, and preferably 5 or greater. Within those limits the catalyst should contain between about 0.4% and 80%, and preferably between about 2% and 50% of total metal hydrogenation catalyst, and between about 0.03% and 5.0%, and preferably between about 0.06% and 2.0% by weight of sulfur.

The finished catalysts of this invention are useful for effecting the reforming of gasoline boiling range hydrocarbon stocks in order to improve the octane rating, decrease the gum-forming tendencies, effect mild desulfurization, denitrogenation, isomerization, dehydrogenation, hydrogenation, and otherwise improve the stock. Such reactions are carried out in the presence of hydrogen at temperatures in the range of 650° F. to 1200° F. and preferably in the range of about 800° F. to 1000° F. Under the reaction conditions hydrogen is produced, which is customarily recycled with the incoming feed stock. The reaction is carried out at pressures between about atmospheric and 2000 p. s. i. and preferably in the range of 50 p. s. i. to 1000 p. s. i. The feed rate may vary between about 0.2 and 10.0 volumes of liquid feed stock per volume of catalyst per hour, and between about 500 and 10,000, but preferably over 1000 cubic feet of recycle hydrogen is employed per barrel of feed. For desulfurization procedures, temperatures of between about 600° F. and 800° F. are generally employed.

These reactions may be carried out in a single catalyst zone or in a plurality of catalyst zones, either in series or in parallel, or alternatively the catalyst may be employed in moving bed, fluidized bed or other such types of catalytic processes.

During usage, small amounts of deposits, which comprise mostly carbon, nitrogen and sulfur compounds, accumulate on the catalyst. The slow build-up of such deposit is not serious and does not impair the catalyst activity for a considerable period of time. Because of the relatively good heat stability of the catalyst, such deposit may be removed from time to time as the activity declines by combustion with air at controlled oxidation temperatures, such as below 1100° F. Such regeneration conditions generally will not remove the beneficial sulfide sulfur.

When the catalyst is employed for high sulfur stocks, such as those containing between about 0.5% and 4.0% by weight of sulfur, there is some tendency for the catalyst to decline in activity, which decline seems to result from the slow build-up of an excessive amount and type of sulfur deposit on the catalyst. When the regeneration gases contain steam in excess of 5% and preferably in excess of 15% by volume, the rate of catalyst decline with successive regenerations is considerably lessened.

In certain cases, such as when high-sulfur stocks are being employed as the feed stock, water may be added to the feed to minimize undesirable sulfiding of the catalyst. Usually the added water will amount to between about 0.5 and 10 volume percent of the feed.

After regeneration, the catalyst is normally reduced with hydrogen prior to its employment for hydrocarbon conversions. Fresh catalyst is also reduced with hydrogen normally prior to employment for hydrocarbon conversion.

The preferred feed stocks for the process of this invention are gasoline boiling range hydrocarbon stocks such as those hydrocarbon liquids boiling between about 50° F. and 500° F. In certain cases, higher boiling hydrocarbons may also be employed such as those boiling between about 50° F. and 900° F., or between 500° F. and 900° F., for example. Such hydrocarbon stocks may be derived from petroleum, shale oil, hydrogenated coal, synthetic gasolines and the like.

Where a halogen acid is employed with the metal hydrogenation catalyst, the impregnation solution may be prepared from fluorine-containing inorganic acids such as hydrofluoric acid, fluosulfonic acid and fluosilicic acid and the like, or from a chlorine-containing inorganic acid such as hydrochloric acid, chlorosulfonic acid and the like. The impregnation solution is prepared by dissolving any of the foregoing acids in water.

In general, the fluorine or chlorine retained by the carrier varies directly with the concentration of the impregnating solution. With the use of alumina carriers it has been found that the preparation of catalysts containing between 0.2% and 5% by weight of fluorine or chlorine require impregnating solutions containing between about 0.4 and 10.4 grams of fluorine (as F) or chlorine (as Cl) per 100 ml. of solution.

While other concentrations of fluorine or chlorine may sometimes be employed, catalysts containing between about 0.05% and 5% of fluorine or chlorine and preferably between about 0.2% and 3% of fluorine or chlorine are generally employed when such halogen-containing acids are employed as additional promoters.

Perhaps the process of this invention is best illustrated by the following specific examples:

*Example 1*

An alumina-silica gel containing 95% $Al_2O_3$ and 5% $SiO_2$ was prepared by coprecipitation of an aqueous mixture of sodium aluminate and sodium silicate with carbon dioxide. The precipitate was washed until substantially free of sodium ions, dried at 200° F. to 230° F. and activated by heating for four hours at about 1112° F.

A nickel nitrate impregnation solution was prepared by dissolving about 636 gms. of $Ni(NO_3)_2 \cdot 6H_2O$ in sufficient distilled water to give 500 ml. of solution. About 433 gms. of the dried alumina-silica gel were immersed in the impregnation solution for about 30 minutes, drained, dried at about 250° F. and further activated by heating to about 600° F. The catalyst so prepared contained about 15.8% by weight of nickel oxide, which corresponds to about 12.4% Ni.

Four portions of the activated dried catalyst were then treated individually with $H_2S$ and then with $H_2$ under the following reaction conditions:

| Catalyst | $H_2S$ Treatment | | | $H_2$ Treatment | | | Residual S in Catalyst, Percent |
|---|---|---|---|---|---|---|---|
| | Temp., °F. | p. s. i. g. | Time, Hrs. | Temp., °F. | p. s. i. g. | Time, Hrs. | |
| 1 | 900 | 0 | (a) | 900 | 0 | 3 | 0.27 |
| | | | | | 450 | 8 | |
| 2 | 93–5 | 250–153 | b 18 | 75–900 | 450 | 2.5 | 0.54 |
| 3 | 100–78 | 197–113 | b 48 | 900 | 450 | 2.0 | |
| | | | | 625 | 0 | 0.66 | |
| 4 | 620–650 | 0 | 0.05 | 625 | 450 | 0.167 | |
| | | | | 900 | 450 | 0.167 | | a Equilibrium reached as evidenced by constant temperature in catalyst bed after several minutes.
b Equilibrium reached as evidenced by constant pressure of $H_2S$.

The sulfided and reduced catalysts were then tested for hydroforming activity on a straight-run gasoline stock which boiled substantially in the range of between 200° F. and 400° F., and which had been obtained by distillation of a California crude oil. This gasoline contained about 12% aromatics and had an F–1 clear octane rating of 66 which increased to 78 upon the addition of 3 ml. of lead tetraethyl. The conditions employed for the test were as follows:

Temperature, ° F. _____ 900
Pressure, p. s. i. _____ 450
Process time, hrs. _____ 4
Liquid hourly space velocity _____ 2.0
Hydrogen addition, cu. ft./bbl. of feed _____ 5000

The following analytical data were obtained on the products from the four catalysts:

| Catalyst | Br. No. | Acid Sol. | Liquid Yield, $C_4+$, Vol. Percent | Research Octane Rating | | Gas Make, Cu. Ft./Bbl. feed | |
|---|---|---|---|---|---|---|---|
| | | | | Clear | Plus 3 ml. TEL | $H_2$ | $C_1$–$C_3$ |
| 1 | 1.6 | 37 | 91 | 79.5 | 92.5 | 481 | 66 |
| 2 | 1.6 | 50 | 88.7 | 87.5 | 96.5 | 766 | 136 |
| 3 | 1.9 | 49 | 88.8 | 88.5 | 97.5 | 904 | 154 |
| 4 | 3.1 | 48 | 89.6 | 85.0 | 96.0 | 711 | 116 |

By comparing the acid solubility, octane rating and gas-make results obtained for catalyst 1 with those of catalysts 2, 3 and 4, it is apparent that catalysts sulfided at the reaction temperatures, viz. 900° F., are not as active in promoting the desired reforming reactions as are those catalysts sulfided at lower temperatures. This is true even though the high temperature sulfided catalyst was subjected to severe reducing conditions with hydrogen. It would appear therefore, that the sulfur added at high temperatures inhibits not only the cracking properties of the catalyst, but also its reforming activity.

Example 2

In another similar experiment a nickel oxide catalyst was prepared by impregnating an alumina-silica carrier with sufficient nickel nitrate to form a catalyst containing about 5.2% of NiO, and the resulting composite was treated with $H_2S$ at about 900° F. to form a nickel sulfide on alumina catalyst. This catalyst, without being hydrogenated, was then tested under reaction conditions similar to those of Example 1. A liquid yield of 95.5% of the hydroformed gasoline was obtained, which had a clear octane rating of only 69 and a leaded octane rating of 87.5. The gas make was 169 cu. ft./bbl. of feed of $H_2$ and 82 of $C_1$–$C_3$ hydrocarbons. These data show that, even with a low per cent of total nickel in the catalyst, sulfiding at high temperatures without subsequent reduction with hydrogen, does not give an active hydroforming catalyst.

Example 3

A nickel oxide catalyst similar to that described in Example 1 is prepared by impregnating an alumina-silica carrier with sufficient nickel nitrate solution to give upon calcining a catalyst containing about 5% NiO, and the resulting composite is then treated at about room temperature and atmospheric pressure with $H_2S$ for a short period of time to yield a catalyst containing about 0.1% sulfur. Upon using this catalyst for hydroforming a gasoline stock, results are obtained superior to those of Example 2, but not as favorable as those obtained with catalysts 2, 3 and 4 of Example 1. This indicates that limited sulfiding at low temperatures without hydrogenation produces a catalyst of inhibited cracking tendency, compared to those which are completely sulfided and reduced, or completely sulfided and not reduced.

When it is desired to sulfide without a separate hydrogenation step, a somewhat higher ratio of sulfur to active metal may be permitted in the final catalyst. Any excess sulfur may be reduced by the hydrogen encountered in the hydroforming reaction to a desired equilibrium ratio of preferably less than 1 mole of sulfur to 5 moles of active metal.

Example 4

A nickel oxide catalyst similar to that of Example 1, containing about 10% of NiO, is treated with a mixture of $H_2$ and $H_2S$ in a molar ratio of about 3 to 1 and at about 450 p. s. i. g. and 600° F. The catalyst obtained shows a degree of selectivity for hydroforming reactions as opposed to cracking reactions commensurate with catalysts 2, 3 and 4 of Example 1.

Example 5

A nickel oxide catalyst similar to that of Example 1, containing about 20% of NiO is treated with a mixture consisting of about 20% by volume of $H_2S$ and 80% of $N_2$. The sulfiding is carried out at about 200° F. and 450 p. s. i. g. The sulfided catalyst is mildly reduced with $H_2$ until the S content is brought to about 0.4%, and is then found to selectively promote hydroforming reactions.

Example 6

A nickel oxide catalyst similar to that of Example 1 containing about 35% of NiO is treated with a mixture consisting of about 20% by volume of $SO_2$ and 80% of $H_2$. The treatment is carried out at about 650° F. and 450 p. s. i. g. The sulfided catalyst contains about 1.5% S and is found to selectively promote hydroforming reactions when tested by the methods of Example 1.

Example 7

An impregnation solution is prepared by dissolving nickel nitrate hexahydrate in 1% hydrofluoric acid to produce a solution containing 15 grams of nickel nitrate per 100 ml. A carrier as described in Example 1 is impregnated with this solution, drained, dried, and calcined. The resulting composite, containing about 5.0% NiO, is then sulfided with $H_2S$ at room temperature and atmospheric pressure, and subsequently reduced with $H_2$ at about 900° F. until it contains about 0.12% S. The resulting catalyst gives very favorable selective hydroforming results.

Sulfided cobalt, iron or chromium catalysts supported on alumina-type carriers are prepared by substituting analagous iron, cobalt or chromium compounds for the nickel compounds described hereinbefore. Cobalt has the same order of activity as nickel, and is superior to iron in most cases, however any of these metals from the 4th period of group VIII of the periodic table may be employed with commensurate results.

The term "metal hydrogenation catalyst" as used herein is intended to include both the free metals, their oxides and other compounds in their active catalytic forms.

While the catalysts described herein have been indicated as of particular value in the reforming of gasoline stocks, they may also be useful in other conversion processes, as for example cracking or hydrocracking, if suitable reaction conditions are provided.

From the foregoing it will be seen that this invention provides new catalysts for the catalytic reforming of gasoline stocks in the presence of hydrogen. These new, selectively inhibited metal catalysts have good stability and show high activity for the desired reactions and low activity for the undesired hydrocracking. It is apparent that other metals or metal oxides may be incorporated in these catalysts while still obtaining the desirable attributes of the novel sulfiding process.

The foregoing disclosure is not to be considered as limiting since many variations may be made by those skilled in the art without departing from the scope or spirit of the following claims.

I claim:

1. A catalyst composition consisting essentially of (1) a predominantly alumina carrier, and (2) intimately distributed therein a minor proportion of partiallysulfided nickel oxide, said catalyst composition having been prepared by impregnating said carrier with a soluble nickel salt, drying and calcining the impregnated carrier, and thereafter partially sulfiding the calcined catalyst by a process including as the sole sulfur-depositing treatment, contacting the same at below about 650° F. with a gaseous sulfiding agent, to affix thereon not more than about 0.2 mole of sulfide sulfur per mole of nickel, the final catalyst composition containing between about 2% and 50% by weight of nickel oxide plus nickel sulfide and between about 0.03% and 5% by weight of sulfur.

2. A catalyst as defined in claim 1 wherein said carrier is also impregnated with an inorganic halogen-containing acid, whereby the final composition contains between about 0.05% and 5% by weight of halogen, said halogen being selected from the group consisting of chlorine and fluorine.

3. A catalyst as defined in claim 1 wherein said contacting with gaseous sulfiding agent is followed by a partial desulfiding step comprising hydrogenation at above about 650° F.

4. A process for the catalytic hydroforming of gasoline-boiling-range hydrocarbons to improve the octane rating thereof which comprises contacting said hydrocarbons at a temperature between about 800° and 1200° F. with a catalyst in the presence of hydrogen, said catalyst consisting essentially of (1) a predominantly alumina carrier, and (2) intimately distributed therein a minor proportion of partially sulfided nickel oxide, said catalyst having been prepared by impregnating said carrier with a soluble nickel salt, drying and calcining the impregnated carrier, and thereafter partially sulfiding the calcined catalyst by a process including as the sole sulfur-depositing treatment, contacting the same at below about 650° F. with a gaseous sulfding agent, to affix thereon not more than about 0.2 mole of sulfide sulfur per mole of nickel, the final catalyst composition containing between about 2% and 50% by weight of nickel oxide plus nickel sulfide, and between about 0.03% and 5% by weight of sulfur.

5. A process as defined in claim 4 wherein said partial sulfiding step consists in treating the calcined catalyst with hydrogen sulfide at a temperature below about 650° F., and thereafter reducing the sulfided catalyst with hydrogen at a temperature above about 650° F.

6. A process as defined in claim 4, wherein said partial sulfiding step consists in treating the calcined catalyst with a mixture of hydrogen sulfide and hydrogen at a temperature below about 650° F.

7. A process as defined in claim 4 wherein said carrier is alumina gel containing between about 1% and 15% by weight of coprecipitated silica gel.

8. A process as defined in claim 4 wherein said carrier is also impregnated with an inorganic halogen-containing acid, whereby the final composition containing between about 0.05% and 5% by weight of halogen, said halogen being selected from the group consisting of chlorine and fluorine.

References Cited in the file of this patent

UNITED STATES PATENTS

| | | |
|---|---|---|
| 2,361,825 | Doumani | Oct. 31, 1944 |
| 2,435,380 | Archibald et al. | Feb. 3, 1948 |
| 2,479,110 | Haensel | Aug. 16, 1949 |
| 2,512,570 | Sarter | June 20, 1950 |
| 2,620,362 | Stiles | Dec. 2, 1952 |
| 2,642,381 | Dickinson | June 16, 1953 |
| 2,678,923 | Hansford | May 18, 1954 |